(12) United States Patent
Chakri et al.

(10) Patent No.: US 6,301,987 B1
(45) Date of Patent: Oct. 16, 2001

(54) RETRACTABLE GEARSHIFT LEVER

(75) Inventors: Malek Chakri, Grenoble; Thierry Moreau, Voiron, both of (FR)

(73) Assignee: Societe Europeenne de Fabrications Industrielles Sefi, Tullins (FR)

( * ) Notice: Subject to any disclaimer, the term of this patent is extended or adjusted under 35 U.S.C. 154(b) by 0 days.

(21) Appl. No.: 09/432,405

(22) Filed: Nov. 2, 1999

(30) Foreign Application Priority Data

Nov. 10, 1998 (FR) .................................................. 98 14307

(51) Int. Cl.⁷ .............................. G05G 1/04; F16H 59/04
(52) U.S. Cl. ............................................. 74/473.3; 74/524
(58) Field of Search .................................. 74/473.3, 524; 403/367, 368, 369, 371

(56) References Cited

U.S. PATENT DOCUMENTS

| | | | |
|---|---|---|---|
| 1,743,241 | * | 1/1930 | Schmidt ............................... 74/473.3 |
| 1,908,423 | * | 5/1933 | Hjermstad ............................ 74/473.3 |
| 4,073,199 | | 2/1978 | Simons . |
| 4,823,635 | * | 4/1989 | Selby .................................... 74/524 |
| 5,328,285 | * | 7/1994 | Grubbs et al. .......................... 74/524 |
| 6,029,535 | * | 2/2000 | Kenny et al. ........................ 74/473.3 |

FOREIGN PATENT DOCUMENTS

| | | |
|---|---|---|
| A1-0 464 923 | 1/1992 | (EP) . |
| 2 427 929 | 1/1980 | (FR) . |
| 2 752 779 | 3/1998 | (FR) . |
| 6-241302 * | 8/1998 | (JP) . |

* cited by examiner

*Primary Examiner*—David A. Bucci
*Assistant Examiner*—William C Joyce
(74) *Attorney, Agent, or Firm*—Oliff & Berridge PLC

(57) ABSTRACT

A retractable gearshift lever including a base, a free end articulated about an axle between a deployed position and a retracted position, and a device allowing the free end to be locked in its deployed position. The locking device includes a sleeve which can slide with respect to a first part of the lever—the base or the free end—and which can engage, through complementary shapes, with the end of the second part—the free end or the base—while at the same time remaining in engagement with the first part. An elastic ring, which can move axially with a certain amount of play, is fitted between the sleeve and the first part.

9 Claims, 3 Drawing Sheets

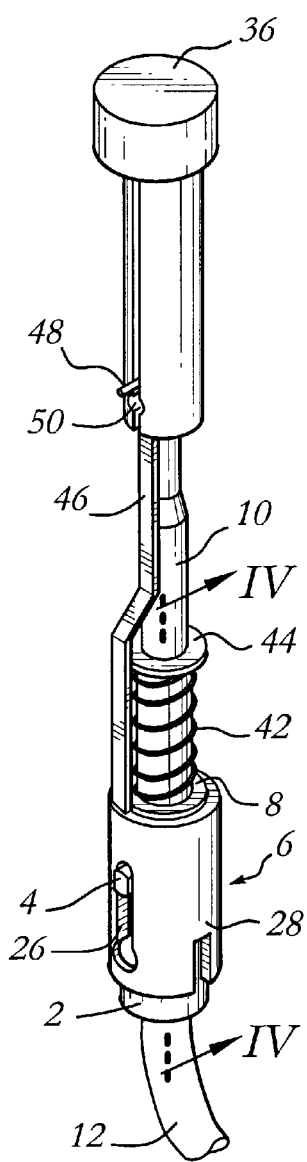
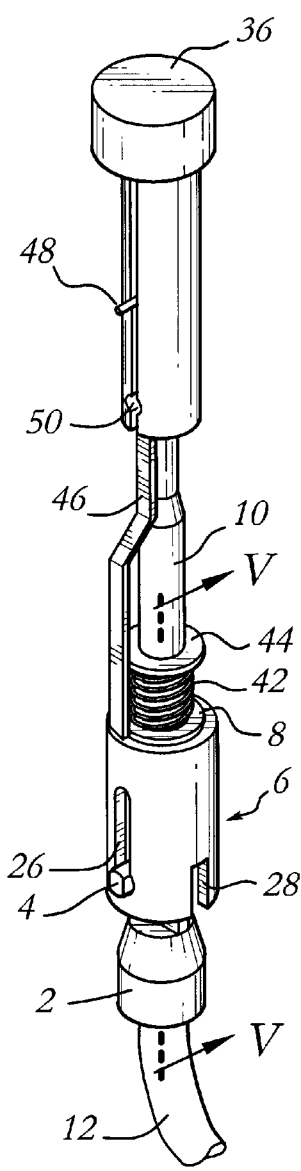
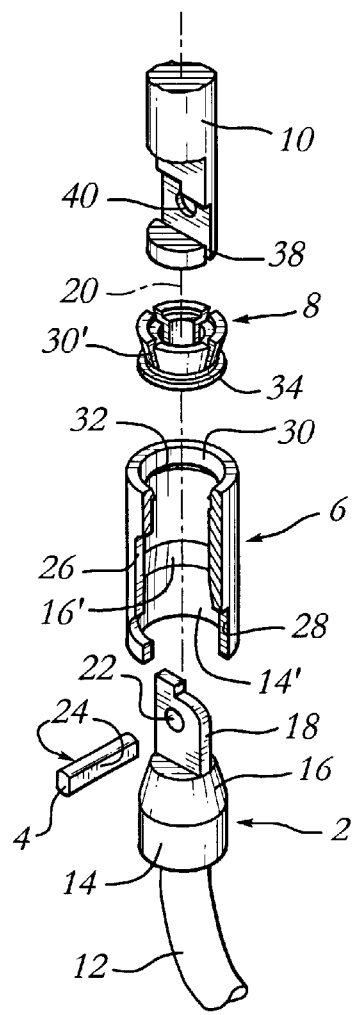

FIG 4
FIG 5
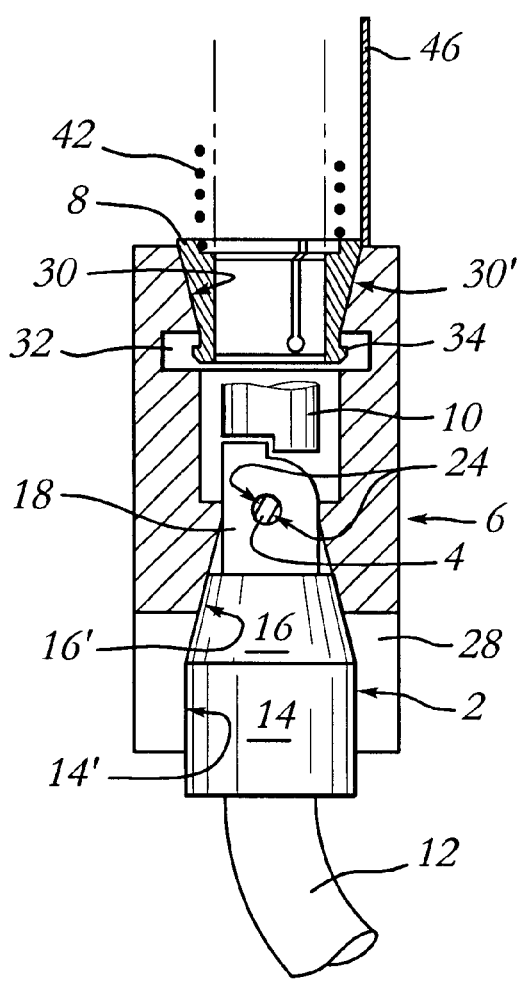
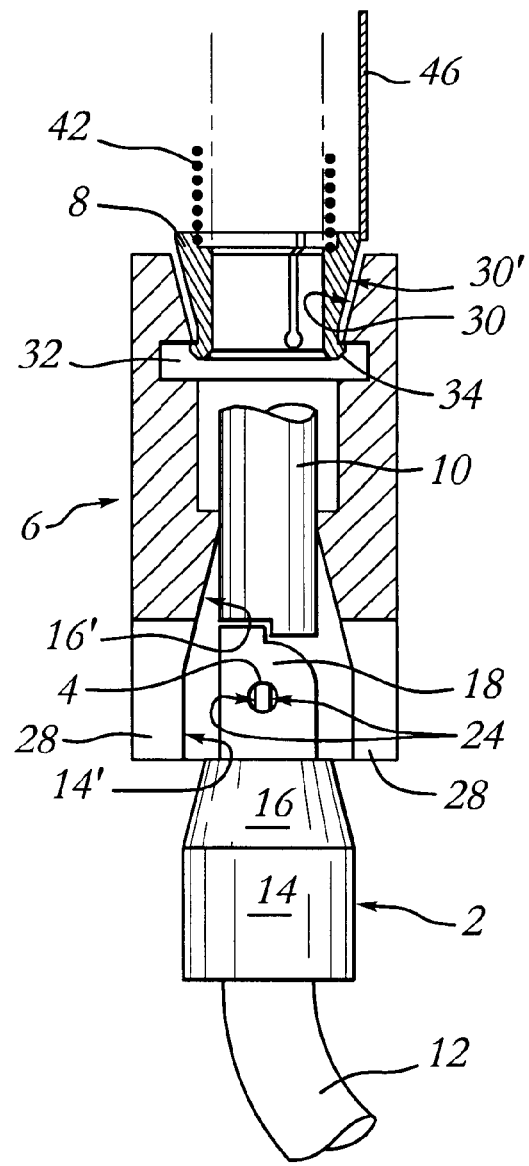

RETRACTABLE GEARSHIFT LEVER

BACKGROUND OF THE INVENTION AND DESCRIPTION OF THE PRIOR ART

The present invention relates to retractable gearshift lever.

It is already known practice for the position of a gearshift lever to be adjusted to suit, for example, the build of a driver. Document discloses such a lever. The latter is therefore mounted on a plate which can move by pivoting. A pin associated with a locking lever, and an element comprising a groove, allow the lever position to be selected and allow the lever to be kept in this position.

Document for its part, relates to a vehicle anti-theft device employing a gearshift lever which is articulated about an axis parallel to the floor of the vehicle and a lock device designed to imprison said lever once it has folded down onto the floor.

The technical problem underlying the present invention is one of providing a gearshift lever which is retractable so that the obstacle that this lever forms in a cabin when the vehicle is parked up can be eliminated. The use of such a lever is envisaged particularly for heavy goods vehicles because truckers often use their cab as living quarters. For this use, the gearshift lever is an obstacle which hampers their movements.

The technical solutions to this problem could possibly be found in the aforementioned devices of the prior art. The first device has the drawback of being very bulky and not allowing full retraction. The second device discussed allows good retraction and proposes a solution with smaller bulk. However, the articulation of the lever is a source of significant play which detracts from the precision of gearshifting and from the comfort of using it.

SUMMARY OF THE INVENTION

The object of the present invention is therefore to provide a retractable gearshift lever which, in its deployed position, introduces no play into the control o f the gearbox of the vehicle. As a preference, this device will be small in bulk and ergonomic.

To this end, the gearshift lever that the present invention proposes is a gearshift lever that can be retracted, between a deployed position and a retracted position, including a base, a free end articulated about an axle which is roughly transversal with respect to the lever, and a device allowing the free end to be locked in its deployed position.

According to the invention, the locking device includes a sleeve which can slide with respect to a first part of the lever—the base or the free end—and which can engage, through complementary shapes, with the end of the second part—the free end or the base—while at the same time remaining in engagement with the first part, and an elastic ring which can move axially with a certain amount of play is fitted between the sleeve and the first part.

By virtue of this method of locking which involves a sleeve and an elastic ring, it is possible to eliminate the play which may be introduced by the fact of providing an articulation.

Furthermore, a lever of this kind has the advantage of requiring only a small amount of space.

The sleeve advantageously has a conical bearing surface at the end facing the first part, collaborating with a conical surface of the elastic ring.

One embodiment therefore envisages for the elastic ring to be a split ring.

One embodiment envisages for the contacting surfaces of the second part and of the sleeve, in the locked deployed position, to have a conical bearing surface.

For better guidance of the sleeve and to limit its travel, the sleeve has, for example, two diametrically opposed slots, in each of which one end of an axle which articulates the free end to the base, slides.

In this embodiment, it may be envisaged for each slot to have a shape reminiscent of a keyhole, having an oblong part of a given width and an approximately round end of a diameter greater than the width of the oblong part, and for the ends of the articulation axle to have flats, the flats sliding in the oblong part of the slots and the diameter of the axle at its ends corresponding to the diameter of the approximately round end of the slots.

For the gearshift lever according to the invention, when moved from its retracted position into the deployed position, to be held securely in the latter position without user intervention, the sleeve, or possibly the split ring, is advantageously elastically prestressed in the deployed locked position.

To make the retractable gearshift lever according to the invention more comfortable for the user, an operating rod may be provided so as to act on the sleeve from the free end of the lever. In this case, in order to avoid inadvertent unlocking, a snap-fastening arrangement is advantageously provided, to keep the operating rod in the position corresponding to the locked deployed position of the lever.

In any case, the invention will be clearly understood with the aid of the description which follows, with reference to the appended diagrammatic drawing which, by way of nonlimiting example, depicts one preferred embodiment of a retractable lever according to the invention.

BRIEF DESCRIPTION OF THE DRAWINGS

FIG. 1 is a perspective view of the lever in its locked deployed position,

FIG. 2 is a perspective view corresponding to the view of the previous figure, the lever being in an intermediate position between the locked deployed position and the retracted position, FIG. 3 shows, in exploded perspective, the various elements of the lever of the previous figures, some of the elements being shown in part section, FIG. 4 is a sectioned view on a larger scale taken on the section line IV—IV of FIG. 1, FIG. 5 is a sectioned view on a larger scale taken on the section line V—V of FIG. 2.

DESCRIPTION OF THE PREFERRED EMBODIMENTS

Figure 6:
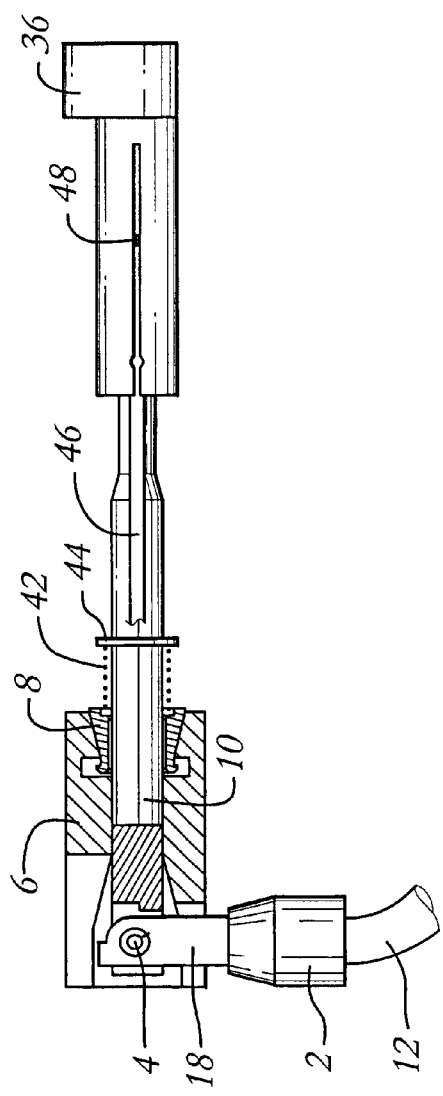
FIG. 6 is a view in longitudinal section of the lever in the retracted position.

FIG. 3 clearly shows various constituent parts of the retractable lever according to the invention depicted in the drawing. This lever includes a base 2, an articulation axle 4, a sleeve 6, a split ring 8 and a lever free end 10.

The base 2 is a part of the gearshift lever which is connected to a gearbox, not depicted, of a vehicle. The connection between the base 2 and the gearbox is, for example, by means of a lever 12. The base has a first circular cylindrical part 14, extended by a conical part 16 attached to the cylindrical part 14, and by a tenon 18. The latter is arranged on the axis 20 of the lever and of the base 2. It has a bore 22 designed to take the articulation axle 4.

The articulation axle 4 is made from 8 circular cylindrical rod along which two diametrically opposed flats 24 have been made. This axle 4 is mounted roughly perpendicular to the axis 20 of the lever.

The sleeve 6 is a circular cylindrical sleeve.

It has two keyhole-shaped slots 26. Each slot 26 has an oblong part the width of which roughly corresponds to the width of the axle 4 in the region of the two flats 24. The end of each slot 26, located at the same side as the base 2, has an approximately round shape, with a diameter roughly corresponding to the diameter of the articulation axle. Thus, the articulation axle 4 can take up its position in the slots 26 and the sleeve 6 can slide along this axle 4. When the ends of the axle 4 are in the region of the oblong part of the slots 26, the sleeve 6 is orientated with respect to the lever, as the edges of the slots have, of necessity, to be facing the flats 24. The latter are oriented in such a way that the axis of the sleeve then coincides with the axis 20 of the lever. When the ends of the axle 4 reach the round end of the slots 26, the sleeve 6 can pivot about the articulation axle 4. To allow this pivoting, two cut-outs 28 are made in the sleeve 6, at the same end as the base 2, facing the tenon 18.

At the same end as the base 2, the interior surface of the sleeve has a shape that complements the shape of the base 2. There is therefore a circular cylindrical part 14' and a conical part 16' inside the sleeve 6.

At the opposite end from the base 2, the interior surface of the sleeve also has a conical surface 30 intended to take the split ring 8. This conical surface 30 ends inside the sleeve 6 in the form of a peripheral annular groove 32.

The split ring 8 has a conical exterior surface 30' which corresponds to the conical surface 30 of the sleeve 6. At its smallest-diameter end, the split ring 8 has a snap-fastening rib 34 projecting radially outwards. This rib 34 is intended to collaborate with the groove 32 in the sleeve 6. The slits in this split ring 8 extend longitudinally and open at the opposite end to the rib 34.

The free end 10 of the lever is of circular cylindrical overall shape and is surmounted by a knob 36. At the same end as the base 2, the free end has a forked part 38 which fits the tenon 18. As can be clearly seen in FIGS. 4 and 5, stops are provided, one on the base 2 in the region of the tenon 18, and the other on the free end 10 in the region of the forked part 38, to prevent the free end 10 from pivoting in the opposite direction to the desired direction. A bore 40 is provided, facing the bore 22, for the passage of the articulation axle 4. The other shapes depicted in the drawing of the free end 10 have no real technical function and are therefore not described in further detail here.

The collection of parts described hereinabove is assembled in such a way that the sleeve 6 and the split ring 8 are on the free end 10. The latter is then mounted on the base 2 and the articulation axle 4 is passed through the bores 22 and 40.

To keep this assembly in the deployed locked position shown in FIGS. 1 and 4, a spring 42, mounted on the end 10, presses on the split ring 8, preloading it in the direction of the sleeve 6. A fixed stop 44 is therefore provided on the end 10, for this spring 42 to rest against.

To make the device easier to operate, provision is made for it to be equipped with an operating pull lever 46. This extends along the end 10 from the split ring 8 to which it is attached as far as near to the knob 36. The end of pull lever 46, at the knob 36 end, is equipped with an easy-to-grasp finger 48.

Figure 7:
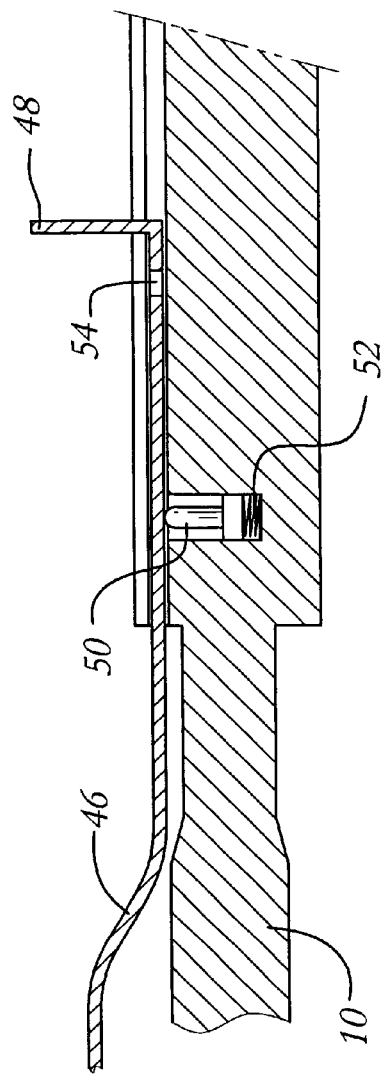
FIG. 7 is a detail view on a larger scale, of the operating means for retracting the lever.

To keep the pull lever in its position corresponding to the locking of the device in the deployed position, an index 50, preloaded by a spring 52, collaborates in a known way with a hole 54 made in the pull lever 46. The index 50 and the spring 52 are housed in a cavity formed in the free end 10, as shown in FIG. 7.

In the locked deployed position, the base 2 and the free end 10 are aligned along the axis 20 (FIGS. 1 and 4). The sleeve 6 covers the base 2 and part of the free end 10. The articulation axle 4 is in the region of the slots 26 at the opposite end to the larger-diameter round end. The split ring 8 rests, via its conical sur face 30', against the surface 30 of the sleeve 6. The rib 34 is in the bottom of the groove 32. The pull-lever 46 is in the locked position.

To move into the retracted position, the pull-lever 46 is unlocked, and by action on the finger 48 is pulled toward the knob 36. The split ring 8 is pulled, against the action of the spring 42, until the rib 34 engages with the groove 32 (FIG. 5). By pulling the finger 48 again, the split ring 8 pulls the sleeve 6 along. This sleeve, guided on the end of the lever 10 and by the ends of the articulation axle 4, stops bearing via conical bearing surfaces on the base 2. When the ends of the articulation axle 4 reach the approximately round part of the slots 26, the sleeve can pivot with the free end 10 about the articulation axle 4. The position depicted in FIG. 6 is thus reached.

To allow the lever to be returned subsequently to the locked deployed position in which it can be used for gearshifting, all that is required is for the folded-down free end 10 to be stood up. The various elements then return to their position shown in FIGS. 1 and 4 under the force of gravity and the force of the spring 42.

This device for retracting a gearshift lever is not very bulky, is reliable and makes it possible to have a gearshift lever which exhibits no play when in the locked deployed position.

As goes without saying, the invention is not restricted to the embodiment described hereinabove by way of nonlimiting example; on the contrary, it encompasses all alternative forms that fail within the scope of the claims hereinafter.

Thus, for example, it is conceivable to nave a lever according to the invention which has no operating pull lever. Likewise, the presence of a slot in the sleeve and of other characteristics are optional.

Nor would it be departing from the scope of the invention if the sleeve, instead of sliding with respect to the free end of the lever, were to slide with respect to the base.

What is claimed is:

1. A retractable gearshift lever, comprising:
    a first part;
    a second part;
    a base;
    an articulation axle having opposed ends;
    a free end articulated about the articulation axle, the axle being substantially perpendicular with respect to the lever, the lever being changeable between a locked deployed position and a retracted position;
    a locking device allowing the free end to be locked when the lever is in the deployed position, the locking device including a sleeve which can slide with respect to the first part of the lever, the first part of the lever being one of the base and the free end and which first part can engage, through complementary shapes, with an end of the second part the second part being the other of the free end and the base, while at the same time the sleeve remains in engagement with the first part; and an elastic locking ring, which can move axially, fitted between the sleeve and the first part.

2. The retractable gearshift lever as claimed in claim 1, wherein the sleeve has a conical bearing surface at an end facing the first part, collaborating with a conical surface of the elastic locking ring.

3. The retractable gearshift lever as claimed in claim 1, wherein the elastic locking ring is a split ring.

4. The retractable gearshift lever as claimed in claim 1, wherein contacting surfaces of the second part and the sleeve, in the locked deployed position, have a conical bearing surface.

5. The retractable gearshift lever as claimed in claim 1, wherein the sleeve has two diametrically opposed slots, in each of which the axle slides.

6. The retractable gearshift lever as claimed in claim 5, wherein each slot has a keyhole shape having an oblong part of a given width and an approximately round part at an end of the oblong part, the round part having a diameter greater than the width of the oblong part, and wherein the opposed ends of the articulation axle have flats, the flats sliding in the oblong part of the slots and the diameter of the axle corresponding to the diameter of the approximately round part of the slots.

7. The retractable gearshift lever as claimed in claim 1, wherein the sleeve or the elastic locking ring is elastically prestressed in the locked deployed position.

8. The retractable gearshift lever as claimed in claim 1, wherein an operating rod is provided to act on the elastic locking ring or sleeve from the free end of the lever.

9. The retractable gearshift lever as claimed in claim 8, wherein a snap-fastening arrangement is provided to the operating rod in the position corresponding to a locked deployed position of the lever.

* * * * *